(12) United States Patent
Pyrcz et al.

(10) Patent No.: US 10,288,766 B2
(45) Date of Patent: May 14, 2019

(54) CONDITIONING OF OBJECT OR EVENT BASED RESERVOIR MODELS USING LOCAL MULTIPLE-POINT STATISTICS SIMULATIONS

(71) Applicant: Chevron U.S.A. Inc., San Ramon, CA (US)

(72) Inventors: Michael James Pyrcz, Humble, TX (US); Sebastien Strebelle, Perth (AU); Tao Sun, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 830 days.

(21) Appl. No.: 14/510,357

(22) Filed: Oct. 9, 2014

(65) Prior Publication Data
US 2016/0103245 A1   Apr. 14, 2016

(51) Int. Cl.
| | | |
|---|---|---|
| *G06F 17/18* | (2006.01) | |
| *G01V 99/00* | (2009.01) | |
| *G01V 11/00* | (2006.01) | |

(52) U.S. Cl.
CPC ............ *G01V 99/005* (2013.01); *G01V 11/00* (2013.01); *G06F 17/18* (2013.01)

(58) Field of Classification Search
None
See application file for complete search history.

(56) References Cited

U.S. PATENT DOCUMENTS

| | | |
|---|---|---|
| 5,475,589 A | 12/1995 | Armitage |
| 5,838,634 A | 11/1998 | Jones et al. |
| 5,999,485 A | 12/1999 | Anstey et al. |
| | (Continued) | |

FOREIGN PATENT DOCUMENTS

WO    2014/051904    4/2014

OTHER PUBLICATIONS

PCT International Preliminary Report on Patentability, International Application PCT/US2015/021387, dated Apr. 20, 2017, 9 pages.

(Continued)

*Primary Examiner* — Craig C Dorais
(74) *Attorney, Agent, or Firm* — Mary R. Bram; Melissa M. Hayworth; Marie L. Clapp

(57) ABSTRACT

A computer-based method of conditioning reservoir model data includes performing a modeling process within a 3D stratigraphic grid to generate an initial model including one or more facies objects within the model volume, the modeling process including parametric distributions, initial and boundary conditions as well as depositional and erosional events to define the facies objects within the model volume. The mismatch between this initial model and the conditioning well data and potential input trend model is applied to compute a locally variable constraint model. The method further includes executing a multiple point statistics simulation with this constraint model that varies between completely constrained by the initial model at locations where the initial model is consistent with known well data and potential input trend models, and unconstrained by the initial model at locations where the initial model does not match known well data or potential input trend models to allow conformance to the known data.

16 Claims, 9 Drawing Sheets

(56) References Cited

U.S. PATENT DOCUMENTS

| | | | |
|---|---|---|---|
| 6,014,343 | A | 1/2000 | Graf et al. |
| 6,018,497 | A | 1/2000 | Gunasekera |
| 6,018,498 | A | 1/2000 | Neff et al. |
| 6,035,255 | A | 3/2000 | Murphy et al. |
| 6,044,328 | A | 3/2000 | Murphy et al. |
| 6,070,125 | A | 5/2000 | Murphy et al. |
| 6,106,561 | A | 8/2000 | Farmer |
| 6,138,076 | A | 10/2000 | Graf et al. |
| 6,295,504 | B1 | 9/2001 | Ye et al. |
| 6,438,493 | B1 | 8/2002 | West et al. |
| 6,477,469 | B2 | 11/2002 | Ye et al. |
| 6,480,790 | B1 | 11/2002 | Calvert et al. |
| 6,560,540 | B2 | 5/2003 | West et al. |
| 6,850,864 | B2 | 2/2005 | Gillard et al. |
| 2002/0042677 | A1 | 4/2002 | West et al. |
| 2002/0183932 | A1 | 12/2002 | West et al. |
| 2004/0008891 | A1 | 1/2004 | Wentland et al. |
| 2004/0068378 | A1 | 4/2004 | Schuette |
| 2004/0210547 | A1 | 10/2004 | Wentland et al. |
| 2009/0043507 | A1* | 2/2009 | Dommisse ............... G01V 1/34 702/6 |
| 2011/0137565 | A1 | 6/2011 | Perlmutter et al. |
| 2013/0329986 | A1 | 12/2013 | Strebelle et al. |
| 2014/0035912 | A1 | 2/2014 | Thorne |

OTHER PUBLICATIONS

International Search Report, dated Oct. 13, 2014, during the prosecution of International Application No. PCT/2014/018524.
Written Opinion of the International Searching Authority, dated Oct. 13, 2014, during the prosecution of International Application No. PCT/2014/018524.
International Search Report, dated Jul. 7, 2015, during the prosecution of International Application No. PCT/2015/021387.
Written Opinion of the International Searching Authority, dated Jul. 7, 2015, during the prosecution of International Application No. PCT/2015/021387.
Al Qassab, H.M., et al.; "Cross-Discipline Data Integration in Reservoir Modeling: Optimizing Fluid Flow Simulation and Reservoir Management"; Abstract, 1 page.
Caers, Jef, et al.; "Geostatistical Integration of Rock Physics, Seismic Amplitudes and Geological Models in North-Sea Turbite Systems"; 2001, SPE 71321, no page numbers.
Caers, Jef, et al.; "Stochastic Integration of Seismic Data and Geologic Scenarios: A West Africa Submarine Channel Saga"; The Leading Edge, Mar. 2003, pp. 192-196.
Carle, S.F.; "Use of a Transition Probability/Markov Approach to Improve Geostatistical Simulation of Facies Architecture"; AAPG Hedberg Symposium, *Applied Reservoir Characterization Using Geostatistics*, Dec. 2000, The Woodlands, TX, pp. 1-10.
Deutsch, Clayton, et al.; "Hierarchical Object-Based Stochastic Modeling of Fluvial Reservoirs"; Mathematical Geology, 1996, vol. 28, No. 7, pp. 857-880.
Hu, L.Y., et al.; "Multiple-Point Simulation With an Existing Reservoir Model as Training Image"; 2014, Math Geosci., vol. 46, pp. 227-240.
Journel, A.G.; "Combining Knowledge From Diverse Sources: An Alternative to Traditional Data Independence Hypotheses"; Jul. 2002, Mathematical Geology, vol. 34, No. 5, pp. 573-596.
Myint, Soe Win, et al.; "A Study of Lacunarity-Based Texture Analysis Approaches to Improve Urban Image Classification"; Computers, Environment and Urban Systems, 2005, vol. 29, pp. 501-523.
Myint, Soe Win, et al.; "Examining Lacunarity Approaches in Comparison with Fractal and Spatial Autocorrelation Techniques for Urban Mapping"; Photogrammetric Engineering & Remote Sensing, Aug. 2005, pp. 927-937.
Ravenne, C., et al.; "Quantification of Facies Relationships Via Proportion Curves"; Chapter 2, pp. 19-39 (with attached Figure 9), 2000.
Samal, A., et al.; "Searching Satellite Imagery with Integrated Measures"; Pattern Recognition, 2009, vol. 42, pp. 2502-2513.
Strebelle, Sebastien; "Conditional Simulation of Complex Geological Structures Using Multiple-Point Statistics"; Mathematical Geology, vol. 34, No. 1, Jan. 2002, pp. 1-21.
Strebelle, Sebastien, et al.; "Modeling of a Deepwater Turbidite Reservoir Conditional to Seismic Data Using Multiple-Point Geostatistics"; 2002, SPE 77425, pp. 1-10.
Strebelle, Sebastien, et al.; "Reservoir Modeling Using Multiple-Point Statistics"; 2001, SPE 71324, pp. 1-11.
Tran, Thomas T.; "Improving Variogram Reproduction on Dense Simulation Grids"; 1994, Computers & Geosciences, vol. 20, No. 7/8, pp. 1161-1168.
Vargus-Guzman, J.A., et al.; "Conditional Simulation of Random Fields by Successive Residuals"; Mathematical Geology, Jul. 2002, vol. 34, No. 5, pp. 597-611.

\* cited by examiner

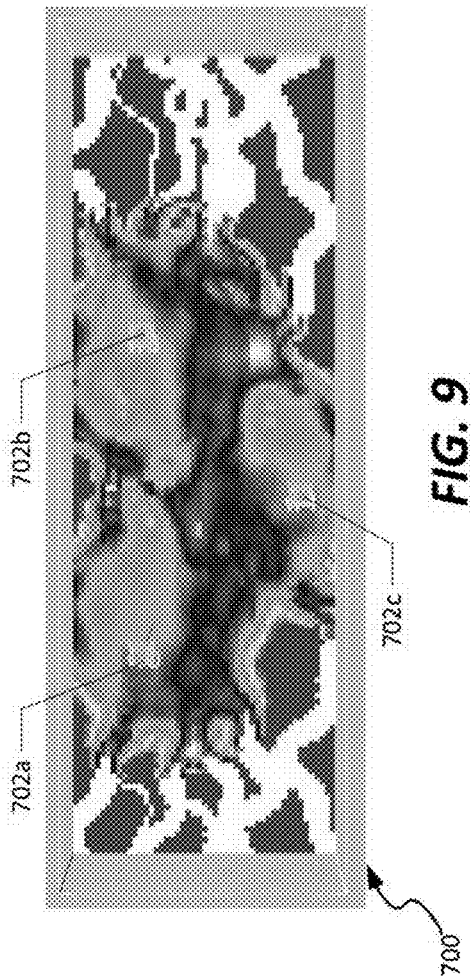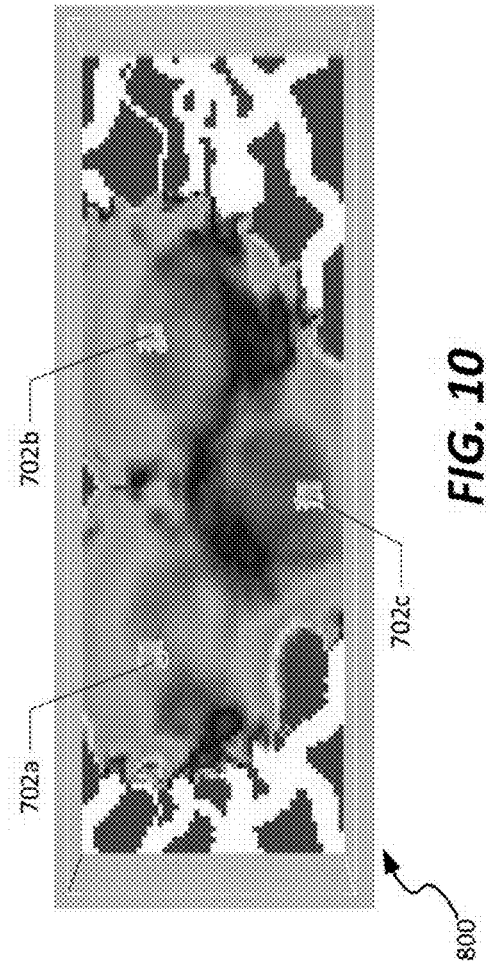

CONDITIONING OF OBJECT OR EVENT BASED RESERVIOR MODELS USING LOCAL MULTIPLE-POINT STATISTICS SIMULATIONS

TECHNICAL FIELD

The present disclosure relates generally to computer-based modeling of physical properties. In particular, the present disclosure relates to conditioning of object or event-based reservoir models using local multiple point statistics simulations.

BACKGROUND

The objective of reservoir modeling is to build 3D models of petrophysical properties (typically porosity, and permeability, and sometimes water saturation) that reservoir engineers can use to run flow simulations, forecast future hydrocarbon production and ultimate recovery, and design well development plans. In most geological environments, especially in clastic environments, porosity and permeability heterogeneity is primarily driven by facies depositional events. As such, porosity and permeability spatial distributions can be mainly characterized through the geometry and location of facies geobodies, for example sinuous sand channels. Therefore geomodelers very often first build 3D facies models (depositional facies, and sometimes lithofacies), and then populate porosity and permeability values within those models.

3D geomodels are usually built in 3D stratigraphic grids generated from a structural and stratigraphic framework, i.e. a set of interpreted faults and stratigraphic horizons. Various sources of information are used by geomodelers to build facies and petrophysical property models, including core and well log data, as well as seismic and dynamic data when available. In addition to actual reservoir data, geomodelers may borrow information from reservoir analogues, e.g., more mature reservoirs (that have more well-known characteristics) that are expected to have characteristics and features similar to the reservoir to be modeled. The modeled reservoir should typically match the well data at well data locations. This is known as well data conditioning. Conditioning to spatial trends away from well data may also be necessary.

Spatial trends, such as downwards decreasing porosity and permeability due to rock compaction or diagenesis or decreasing upwards porosity and permeability within a facies body due to waning energy in deposition, may be present in the reservoir. To account for such trends in reservoir models, petrophysical or facies input trend models need to be generated and imposed during the modeling process. 1D vertical trend curves and 2D horizontal trends maps are the most common trend models used to constrain reservoir models. Vertical trend curves provide a target petrophysical property average value or target facies proportion values in each layer of a grid of columns and layers in which a model is to be built. This may be further restricted by specific regions of the grid that are modeled separately. In each grid layer, the target property average value or the target facies proportion values can be based on a mean value of well data for that property in the layer, and edited by the modeler to address limited well data, data bias and analogue information. Furthermore, areal trend maps provide a target petrophysical average value or target facies proportion values along each column of a grid in which a model is to be built. In each column, such target values can be initialized as a mean value of well data in the column, or, if such well data is not present in the column, can be based on an interpolated average value based on previously computed columns, such as those columns including well data. This interpolation can be based, for example, on inverse distance or a kriging computation. A user, typically a geomodeler, can then edit the property areal trend map, particularly in areas away from well data. In some cases, 3D trend models can also be generated by calibrating secondary data available at each model cell, typically seismic attributes, to known well data, or by quantifying a reservoir stratigraphy interpretation. Such 3D models provide a prior local property average value, or prior local probabilities of facies occurrences in each cell of the grid in which a model is to be built. This trend model could vary from weakly informative (e.g. local proportions close to global proportions) to strongly informative and when the inter-well information supports, indicating a degree of certainty. This component of model conditioning is called an "input trend model" for the remainder of this document.

The geomodeler may opt to use any of a variety of modeling methods, such as object-based or event-based modeling to build facies models. The object-based and event-based model approaches consist in dropping objects that correspond to facies geobodies, for example sand channels, with user-specified geometries and dimensions, within the 3D grid (the space to be modeled). An iteration process is typically used to add, remove, translate, and rotate objects until the simulated objects fit to conditioning data, i.e. well data having known facies. The main difference between the object-based and event-based approaches is that event-based modeling simulates the sequence of deposition events through time by dropping objects starting from the reservoir bottom to the reservoir top according to stratigraphic rules and with surface-based models of the evolving topography, whereas object-based modeling distributes objects within the 3D grid using a purely stochastic approach. However, both approaches have the drawback of poor correlation to conditioning data, since such conditioning data is drawn from real-world observations at specific well locations and may not be consistent with the user-specified geometry and dimensions of the objects to be simulated. Even when the well data is completely consistent with the object geometries, due to the large combinatorial space of all possible objects configurations within the reservoir model, object- and event-based methods often stop short and fail to completely match well data. Mismatches between reservoir models and conditioning well data can be significant either where there is a large amount of well data having known facies, or when objects are large, typically larger than the average inter-well distance. For that reason, tolerances may be introduced in object-based or event-based modeling programs to allow models to intentionally depart from conditioning data in areas of known well data, and accelerate the modeling process. Furthermore, object-based or event-based models may depart from input trend models, especially in the case of abundant conditioning well data, or when a high level of short-scale variability is present in the input trend model.

For these and other reasons, improvements for object-based and event-based simulation methods to match dense data and/or detailed input trend models are desirable.

SUMMARY

In summary, the present disclosure relates to computer-based modeling of physical properties. In particular, the present disclosure relates to conditioning of object- or event-based reservoir models using local multiple point statistics simulations.

In a first aspect, a computer-based method of conditioning reservoir model to well data and an input trend model includes performing a modeling process within a stratigraphic grid corresponding to a subsurface volume to generate an initial model including one or more facies objects within the grid, the modeling process using an object-based or event-based approach and including parametric distributions, initial and boundary conditions as well as depositional and erosional rules to define interactions among facies objects within the grid. The method also includes measuring the mismatch between the initial model and the conditioning well data and potential input trend models used during the modeling process, and deriving a locally variable constraint model from those local mismatch measurements. The method further includes using the previous locally variable constraint to execute a multiple point statistics simulation that varies between completely constrained by the initial model at locations where the initial model is consistent with known well data and potential input trend models, and completely unconstrained by the initial model at locations where the initial model does not match known well data or potential input trend models, thereby allowing conformance to known well data and potential input trend models.

In a second aspect, a system for conditioning reservoir model data is disclosed that includes a computing system including a programmable circuit and a memory, the memory storing a reservoir modeling application. The programmable circuit is configured to execute program instructions included in the reservoir modeling application which, when executed, cause the computing system to generate an initial model including one or more facies objects within a stratigraphic grid corresponding to a subsurface volume, the modeling process using an object-based or event-based approach and including parametric distributions, initial and boundary conditions as well as depositional and erosional rules to define interactions among facies objects within the grid. The instructions also cause the computing system to measure the mismatch between the initial model and the conditioning well data and potential input trend models used during the modeling process, derive a locally variable constraint model from those local mismatch measurements, and use that locally variable constraint to execute a multiple point statistics simulation that varies between completely constrained by the initial model at locations where the initial model is consistent with known well data and potential input trend models, and completely unconstrained by the initial model at locations where the initial model does not match known data or potential input trend models, thereby allowing conformance to all known well data and potential input trend models during the multiple point simulation.

In a third aspect, a system for conditioning reservoir model data is disclosed. The system includes a computing system including a programmable circuit and a memory, the memory storing a reservoir modeling application and a reservoir model. The programmable circuit is configured to execute program instructions included in the reservoir modeling application which, when executed, cause the computing system to: define the reservoir model as a representation of a subsurface volume, the reservoir model including a stratigraphic grid including a plurality of columns and a plurality of layers, the reservoir model defining a plurality of properties at each layer in each column; perform an object-based or event-based modeling process within the grid to generate an initial model defining one or more facies objects stored within the grid, the object-based or event-based modeling process including initial and boundary conditions as well as parametric distributions, depositional and erosional rules to define interactions among facies objects within the grid; measure the mismatch between the initial model and the conditioning well data and potential input trend models used during the modeling process, and derive a locally variable constraint model from those local mismatch measurements; use that locally variable constraint to execute a multiple point statistics simulation that varies between completely constrained by the initial model at locations where the initial model is consistent with known well data and potential input trend models, and completely unconstrained by the initial model at locations where the initial model does not match known well data or potential input trend models, to allow conformance to known well data and potential input trend models.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 9 illustrates application of the adjustable SPC ranges of FIG. 6, as applied to the "unsmoothed" layer data using a 10 cell smoothing size, according to example embodiments; and FIG. 10 illustrates application of the adjustable SPC ranges of FIG. 6, as applied to the "unsmoothed" layer data using a 20 cell smoothing size, according to example embodiments.

DETAILED DESCRIPTION

As briefly described above, embodiments of the present invention are directed to conditioning of object or event based models by using local multiple-point statistics simulations. Use of such simulations allows correcting for mismatches between object- or event-based models and conditioning well data, as well as for local departures of object- or event-based models from input trend models that may prove relevant to the specific location within the model (e.g., the column and layer within the grid) under review. The use of such post-processing results in maximum flexibility to honor well data precisely, while concurrently honoring input trend models to the extent possible.

Existing iterative, dynamic, or geometric correction methods have been attempted; however, none of these methods have reliably honored dense well data or detailed input trend models. Some level of mismatch with between model and well data and input trend models often remains.

Figure 1:
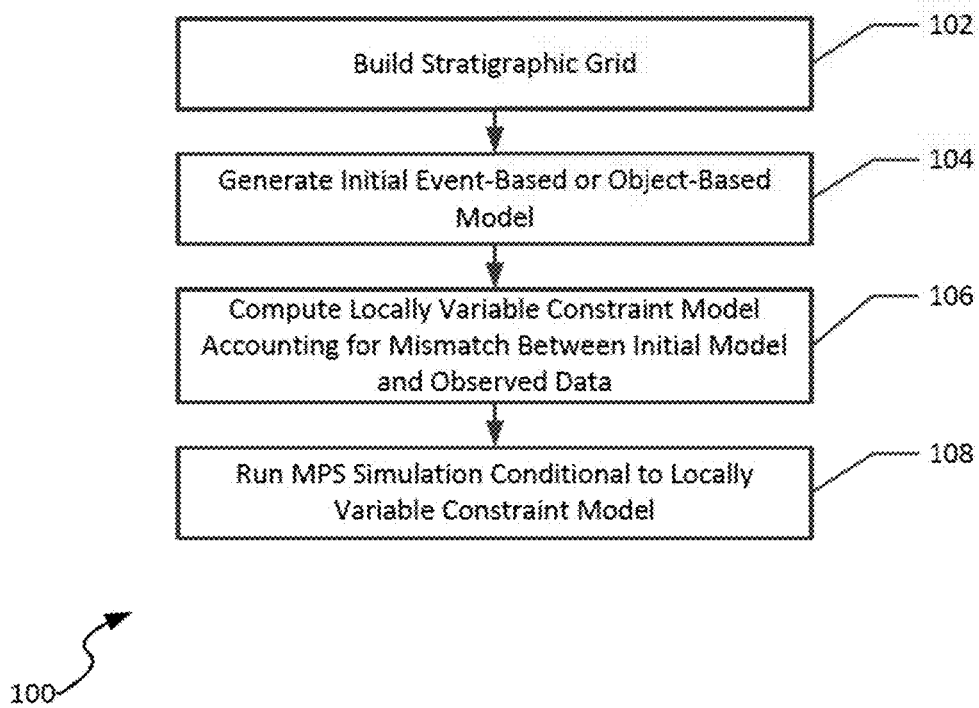
FIG. 1 illustrates a flowchart of a method for modeling of subsurface properties, according to an example embodiment of the present disclosure.

Referring to FIG. 1, generally, an example flowchart in which a method 100 of modeling of subsurface properties is disclosed, according to an example embodiment of the present disclosure. The method 100 generally can be performed by a computing system, such as the system described below in connection with FIG. 2, to model reservoir characteristics. In some embodiments, the method 100 can be used to model subsurface reservoir characteristics, such as facies or other characteristics (e.g., porosity, permeability, etc.) of underground volumes of interest, such as for hydrocarbon exploration, modeling, and forecasting.

In the embodiment shown, the flowchart includes a grid building operation 102. The grid building operation builds a stratigraphic grid associated with a particular geographic area of interest. A stratigraphic grid corresponds generally to a three-dimensional representation of a particular volume of interest. Such a volume of interest can be, for example, a subsurface volume in a sedimentary basin, either underground or undersea. The stratigraphic grid can include, for example, a plurality of layers and a corresponding plurality of columns of a predetermined or varying size.

In the embodiment shown, the method 100 also includes a model building operation 104. The model building operation 104 performs a modeling process within the model volume formed in the model definition operation 102, to generate a model including one or more facies objects. In example embodiments, the model is built using an initial event-based or object-based model that is condition to well data and potential facies proportion input trends. It is noted that, at this stage, the model that is generated may not match or correlate will with the well data and/or may not be consistent with facies proportion input trends in some areas within the stratigraphic grid. Example processes for event- or object-based modeling are described in U.S. Pat. No. 8,606,555, entitled "System and Method for Modeling a Geologic Volume of Interest", the disclosure of which is hereby incorporated by reference in its entirety.

The model of the geologic volume of interest represents, in some embodiments, one or more of the geologic parameters of the geologic volume of interest as a function of position within the geologic volume of interest. By way of non-limiting example, the geologic parameters, and/or the trends or distributions thereof (e.g., including parametric distributions), describe one or more of flow source, channel size parameter, a fractional fill parameter, an equilibrium profile, channel morphology spectrum, sinuosity, flow composition, channel fill heterogeneity and/or trends, substrate erodability, an aggradation rate, flow volume and/or momentum, and/or other geologic parameters that may define the reservoir of interest in the object-based or event-based model.

In the embodiment shown, the method 100 also includes a locally variable constraint model computation operation 106. The locally variable constraint model computation operation 106 accounts for a mismatch between initial event-based or object-based model computations and the well data and/or facies proportion trends that are present and for which there may be a mismatch in the initial model built during the model building operation 104.

Generally, and as further discussed below in connection with FIG. 2, the locally variable constraint model computation operation 106 can be performed in a variety of different ways. However, and as noted below, such operations typically will identify the areas that should be resimulated using multiple point statistics, or alternatively what areas of the model should be "frozen" to retain the original model constrains based on a local mismatch to data and trend models. Additionally, in areas that are identified as requiring re-simulation, the locally variable constraint model computation operation 106 will determine how similar to the initial event-based or object-based model the re-simulated MPS model should be.

In the embodiment shown, the method 100 also includes performance of a multiple point statistics operation 108. The multiple point statistics operation 108 is performed across the model volume, and is used to conform the model generated using the event-based or object-based modeling of model building operation 104 to known data, e.g., well data, within the volume. In example embodiments, a particular area around known data can be selected as a window within which a model can be conformed to known data. Based on the multiple point statistics operation, a locally variable constraint model is created. Various mechanisms by which the locally variable constraint model can be created are discussed in further detail below in connection with FIG. 3.

Irrespective of the types of local weighting performed, a more generalized version of the multiple point statistics operation 108 can be performed in a variety of ways. Example multiple point statistics operations are described, for example, in U.S. Pat. No. 7,516,055, entitled "Multiple-Point Statistics (MPS) Simulation With Enhanced Computational Efficiency", the disclosure of which is hereby incorporated by reference in its entirety.

Figure 2:
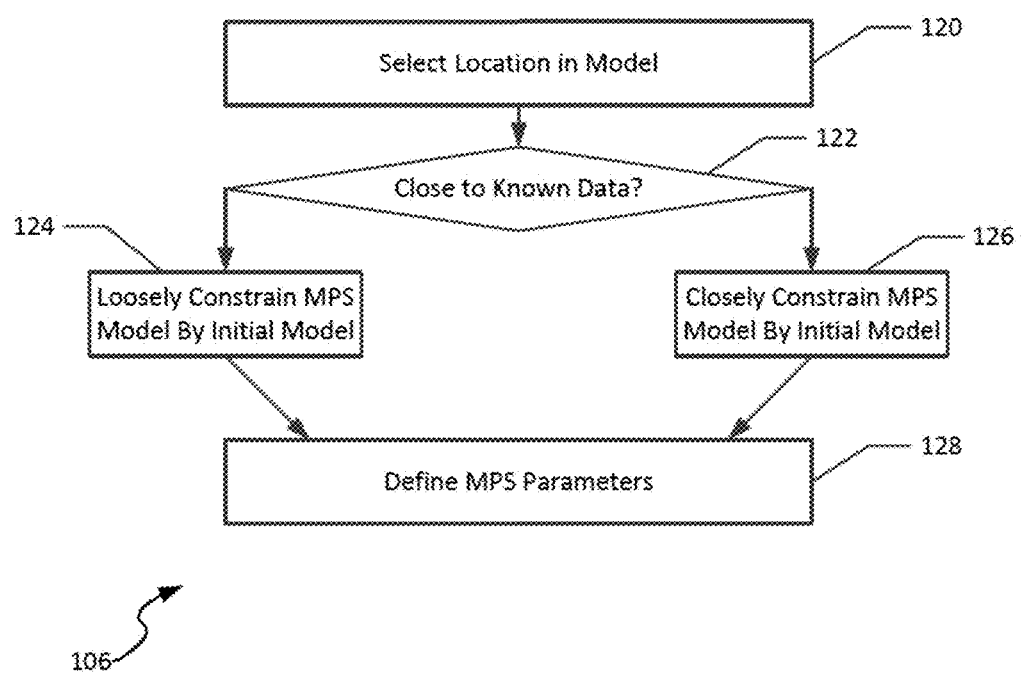
FIG. 2 illustrates a flowchart of aspects of the modeling features of FIG. 1, forming a locally variable constraint model.

Referring now to FIG. 2, a flowchart of an example process by which the locally variable constraint model computation operation 106 can be executed is shown, according to an example embodiment. As illustrated in this example, the locally variable constraint model computation operation 106 can condition one or more locations within the model to determine whether there is a close match between the initial model created during model building operation 104 and either (1) known data, such as well data, or (2) facies proportion trends, such as facies proportion curves.

In particular, as shown, the locally variable constraint model computation operation 106 will select each location within the model at a location selection operation 122, and determine at mismatch operation 124 whether the model has departed from known data by a predetermined amount. The known data can take a variety of forms. In some embodiments, the known data can be well data, and as such includes facies information at a particular column and at a number of different layers. The well data can also include various measurements at each layer, for example pressure, temperature, porosity, permeability, or other data observed at or derived from observations at a particular column and layer. Such known data can include, for example, measurements taken at a geologic volume of one or more geologic parameters of the geologic volume, and/or trends or distribution characteristics of geologic parameter(s). For instance, such known data can include measurements taken from equipment positioned within one or more wells drilled at or near a geologic volume, seismic data (or information derived therefrom) acquired at the surface at or near a geologic volume, and/or other measurements of one or more characteristics of a geologic volume.

The predetermined amount can be determined any of a number of ways. In example embodiments, at each location a facies probability cube can be calculated by smoothing the initial event-based or object-based model using a moving average window in the area of consideration, using a window of predetermined (and optionally adjustable) size. Using such an approach, the closer to the marginal facies proportions that the facies probability cube will be, the less constraining the initial event-based or object-based model will be.

Accordingly, if the model is close to the known data (e.g. in location, based on the above moving average approach), the locally variable constraint model computation operation 106 will closely constrain the multiple point statistics operation 108 by the initial model (depicted as operation 126); however, further away from the known data, the locally variable constraint model computation operation 106 will loosely constrain the MPS operation by the initial model (depicted as operation 128). Based on this determination, MPS parameters are determined at operation 128 for use in the multiple point statistics operation 108 of FIG. 1. This allows conformance to the known well data and potential input trend models.

It is noted that, although illustrated herein as an either/or process, in actuality based on the moving average the extent to which a model is either tightly constrained or loosely constrained to the initial model is more accurately considered to be a gradient of varying types, based on the moving average and probability cube approach discussed above. Accordingly, FIG. 2 illustrates the two extremes (close association with or loose association with the initial model) for simplicity, but the present disclosure is not so limited.

Figure 3:
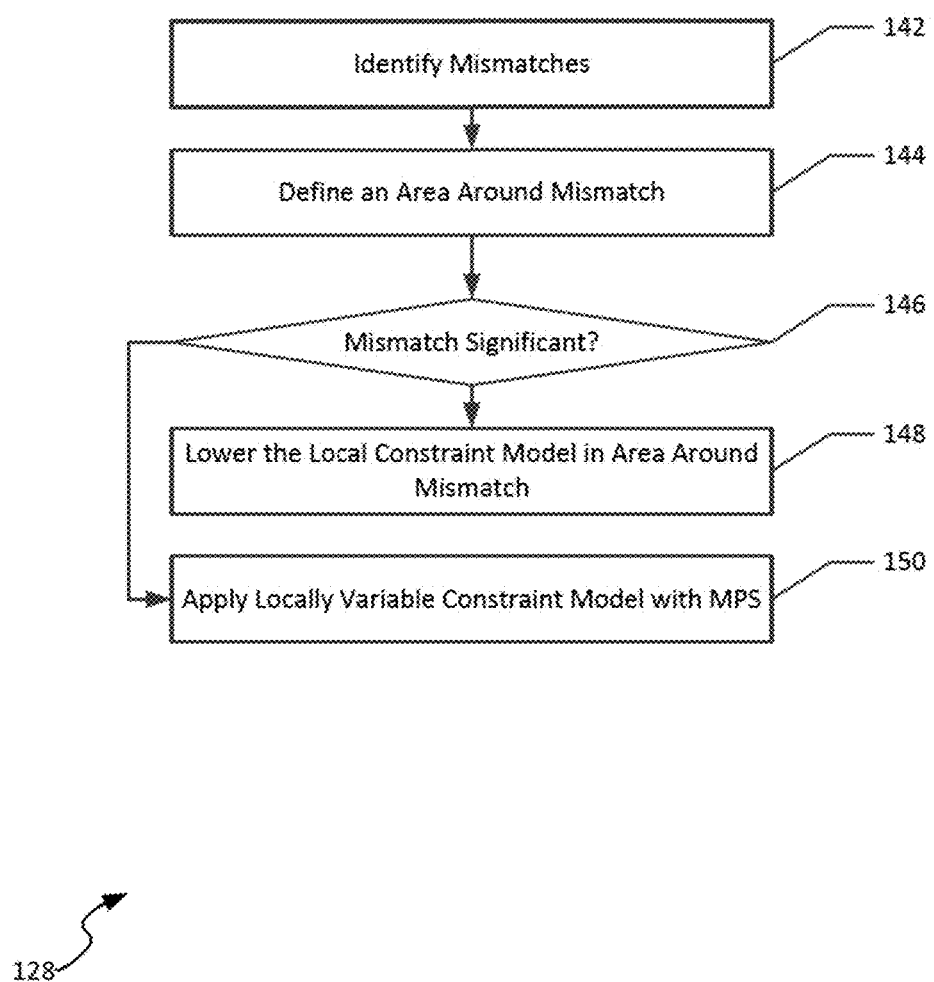
FIG. 3 illustrates a flowchart of a method of forming a locally variable constraint model based on the determination of local data as applied in FIG. 2.

Referring to FIG. 3, further details regarding building of the locally variable constraint model computation operation 106 are depicted, according to example embodiments. The details depicted in FIG. 3 relate to the manner in which MPS parameters are determined at operation 128 of FIG. 2, in example embodiments.

Generally, to define the locally variable constraint model, constraints comparing known data and the initial MPS model are determined In particular, mismatches are located and quantified in the model volume at locations where known data exists, at mismatch quantifying operation 142. An area around that mismatch can then be defined at operation 144. For example, the area around the mismatch can be a user-selected size of a sliding window to be applied in the area of the mismatch; example sizes can be, for example, 10-50 cell elements (e.g., adjacent columns and/or rows of the stratigraphic grid). The effect of different cell sizes is discussed and illustrated in further detail below.

In the case of facies proportion trend inconsistencies, it is determined whether such inconsistencies are significant, at operation 146. For example, it may be that in some cases, the local constraint model may be strongly inconsistent relative to a facies proportion curve. If so, a facies proportion curve is computed from the initial event-based or object-based model by computing facies proportions in each layer of the stratigraphic grid, and defining layers that require resimulation as layers in which the difference between target facies proportions and simulated facies proportions is greater than a user-specified threshold. If the proportion trend is a facies proportion map, the facies proportion map is computed from an initial event-based or object-based model by computing facies proportions along each column of the stratigraphic grid, and columns are defined that should be resimulated based on whether a difference between target facies proportions and simulated facies proportions is greater than a user-specified threshold (as determined at operation 146).

In alternative embodiments, where the facies proportion trend that is mismatched is a three-dimensional facies proportion cube, the facies proportion cube can be computed from the initial model by smoothing the model using a moving average window as discussed above, with cells defined to be resimulated as the cells where a difference between facies probabilities and simulated facies probabilities are greater than a user-specified threshold.

Of course, in areas where both well data mismatch and facies proportion trend inconsistencies are noted, both types of areas should be addressed. In any of the above cases, if the mismatch is significant, the local constraint model is lowered in the area around the mismatch, e.g., at operation 148. Otherwise, the local constraint model in the area is acceptable, and can be applied with MPS to perform the desired modeling in the area of concern (at operation 150).

Referring back to FIG. 1, as part of the multiple point statistics operation 108, a number of operations can be performed, depending upon the particular area of interest where the multiple point statistics operation is applied. For example, at points spaced apart from known data, a constraint operation 110 will enforce constraint to the existing trend model generated by the event-based or object-based modeling process.

Accordingly, areas where local trends depart from an overall trend (due to known data or other reasons why such trends may exist), allowing greater conformance to local data in cases where a reservoir-wide object or event-based model may not accurately depict local features. In such cases, because local trend information may be disjoint from other local trends or other information that is known or otherwise represents the "best available" information in a particular portion of the overall reservoir volume, parameters supplied to the MPS operation 108 allows for a local trend model to be used to condition the MPS simulation process, to cause conformance to such "best available" data.

Upon completion of the method 100, a locally variable specificity proportion trend model is created that varies locally between exact constraints on the event- or object-based model (where a final model corresponds to the prior model) to completely naïve, based on local trends or global proportions.

Figure 4:
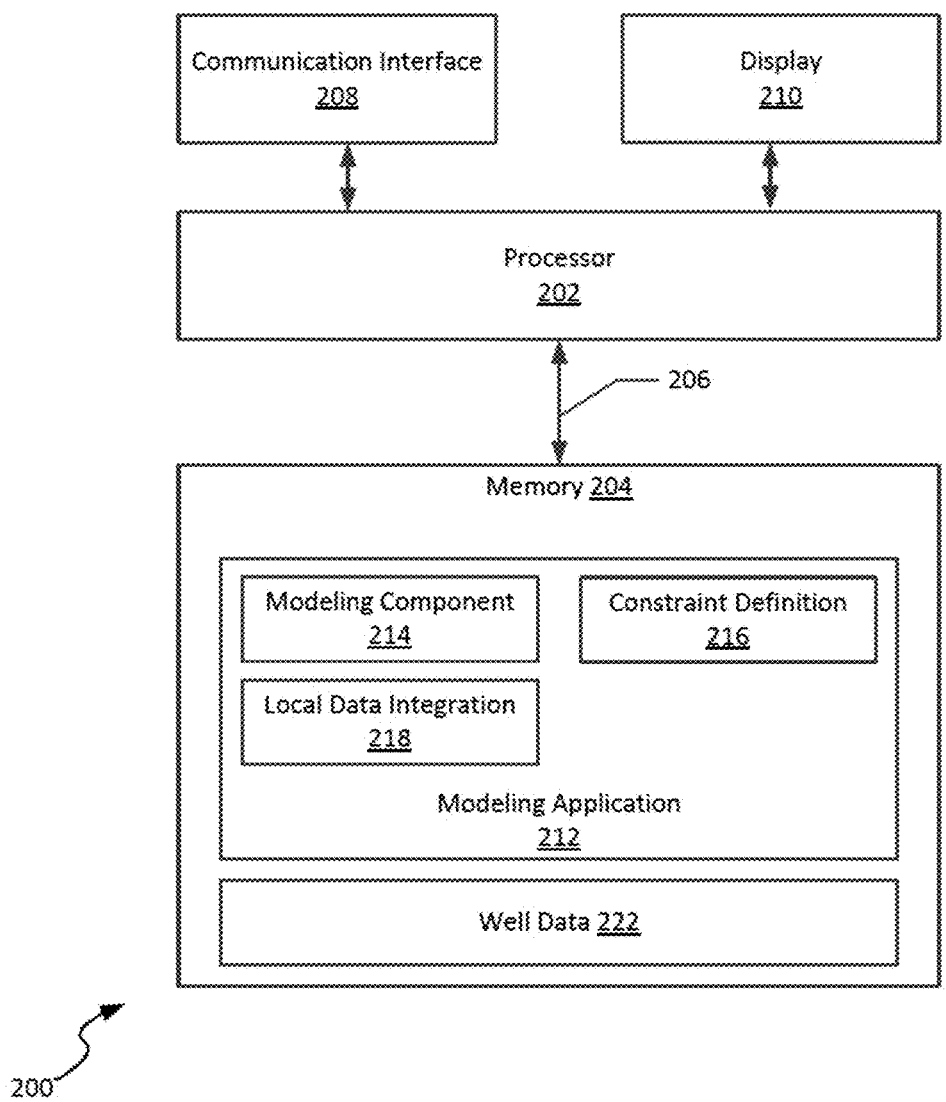
FIG. 4 illustrates a computing system useable to implement a system for input trend modeling of subsurface properties, according to an example embodiment of the present disclosure.

Referring now to FIG. 4, a schematic block diagram of a computing system 200 is shown. The computing system 200 can be, in some embodiments, used to implement a the method 100 according to the present disclosure in which event- or object-based models can be modified based on multiple point statistics in areas near known data. In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 204 stores a modeling application 212, discussed in further detail below. The computing system 200 can also include a communication interface 208 configured to receive and transmit data, for example well data or other real world data required for modeling purposes. Additionally, a display 210 can be used for presenting the modeling graphics, or allowing a user to define model parameters for a subsurface volume.

In various embodiments, the modeling application 212 receives one or more parameters that can be used for one or both of the object-or event-based modeling processes and the MPS simulation process. As discussed in further detail below, the MPS simulation process used herein can use, for example, a smoothing window size, a local size around well data that is modeled as the well data, and/or an overall distance from the well at which the well data no longer affects the underlying event-based or object-based model. In the embodiment shown, the modeling application 212 includes a modeling component 214, a constraint definition component 216, and a known data integration component 218.

The modeling component 214 provides object-based or event-based modeling within a model volume of interest. The modeling component 214 can be used to generate an initial model, or, in alternative applications, can generate a refined model accounting for known data (e.g., from local data integration component 218) receives one or more constraints, for example via a constraint definition component 216 which receives such constraints from a user. In example embodiments, the constraints can include information based on existing observations, historical experience, or other types of data or expert knowledge. Such information can take the form of local data models, or an extent to which constraints should be applied for subsequent MPS-based modeling by the modeling component 214. This can include, for example, a smoothing window size, as well as various other smoothing parameters discussed herein. Based on the constraints, the modeling component 214 can, based on the constraints defined by a user, calculate an event-based or object-based model, as described above in connection with FIGS. 1-3. Additionally, other constraints may be used in an MPS simulation process as discussed above, and as further detailed below.

In example embodiments, the modeling component 214 can be used in a variety of ways. For example, in some embodiments, search parameters and simulation nodes are selected to maximize consistency between an area updated by the MPS process and the underlying model generated by the modeling component, for example by applying a gradient between a known data point based on a predetermine distance and rate of constraint to the underlying model, thereby allowing for gradually increasing constraint to the underlying model as distance from known data points increase. Such selections of parameters used by the modeling component 214 can be set, for example via a user interface provided by the application 212, and allows the user to select and set an extent to which a model ultimately produced by the application is constrained to one or more of (1) an underlying event-based or object-based model, (2) known data, such as well data, or (3) local trend models. Details regarding such a model, including discussion of window sizes that can be used to generate that model, are described and depicted below in connection with FIGS. 5-10.

In some embodiments, the extent to which either the original model (event- or object-based) or the known well data or local trend data constrains the MPS simulation performed by the modeling component 214 is not entirely to one or the other extreme. In such embodiments, a user may be allowed to select or set a limit, using the application 212, as to how an ultimate model is constrained to either the known data or to the object-based or event-based model. Further, in some embodiments, the extent to which there is a mismatch between the model and the known data provided to the MPS simulation defines the extent to which the MPS simulation is constrained to one or the other set of data. In still further embodiments, a density of known data may also define the extent to which the MPS simulation is constrained to that data.

In some embodiments, the modeling component 214 is constrained, via receipt of a constraint at the constraint definition component 216, to constrain the MPS process to non-stationarity information, such as using a locally variable orientation and a training image. By using the non-stationarity information consistency with a prior event-based model can be maintained.

Figure 5:
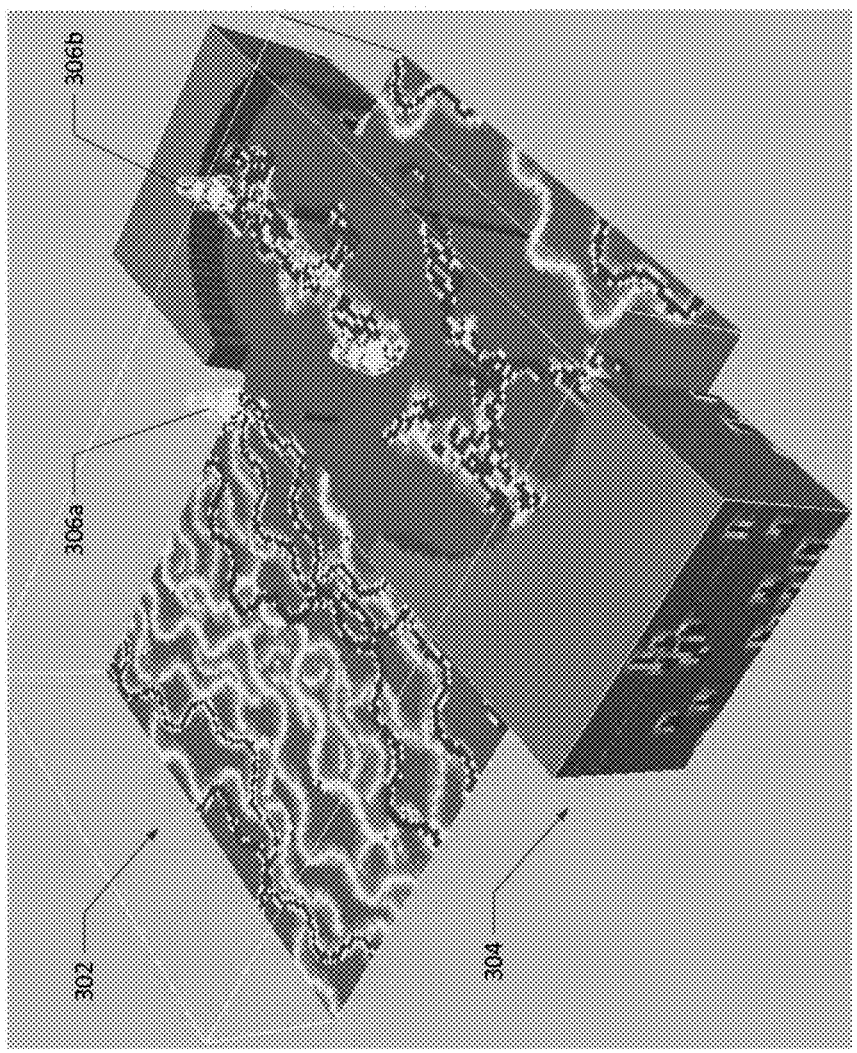
FIG. 5 illustrates an example subsurface volume to be modeled, according to example embodiments.

Referring now to FIGS. 5-10, illustrations of example processes including both event-based simulation and MPS-based processing to improve consistency between the model and known data in areas of known data are shown, representing the changes to a locally variable specificity proportion trend model. FIG. 5 illustrates an example graphical modeling scenario 300 in which aspects of the present application can be implemented. As illustrated in FIG. 3, a first model volume 302 includes a grid of layers and columns, which intersects with a simulation grid 304 having corresponding layers and columns. A plurality of wells 306, shown as wells 306a-b, are also included in that volume, and represent locations at which known data exists.

Figure 6:
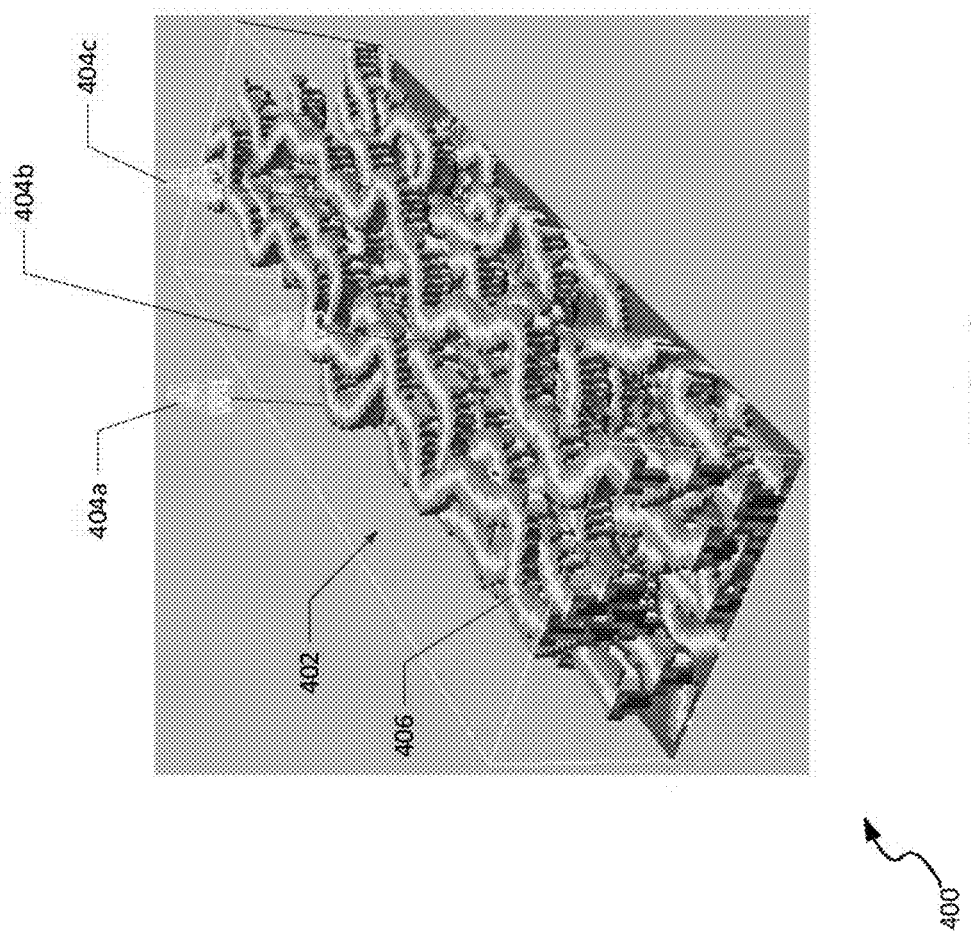
FIG. 6 illustrates an example initial model in which event-based or object-based models can be adjusted using local multiple-point statistics, according to example embodiments discussed herein.

FIG. 6 illustrates an example model 400 used for well conditioning, according to example embodiments. As illustrated, the model 400 includes a model volume 402 in which a plurality of wells 404 exist, shown as wells 404a-c. One or more channels 406, which can correspond to, for example, paths through the subsurface sediment though which hydrocarbons may flow or reside, are also included in the model for simulation purposes. Of course, it is noted that in some embodiments, the model 400 may not match all well data, in which case some accommodation for known well data should be provided.

Figure 7:
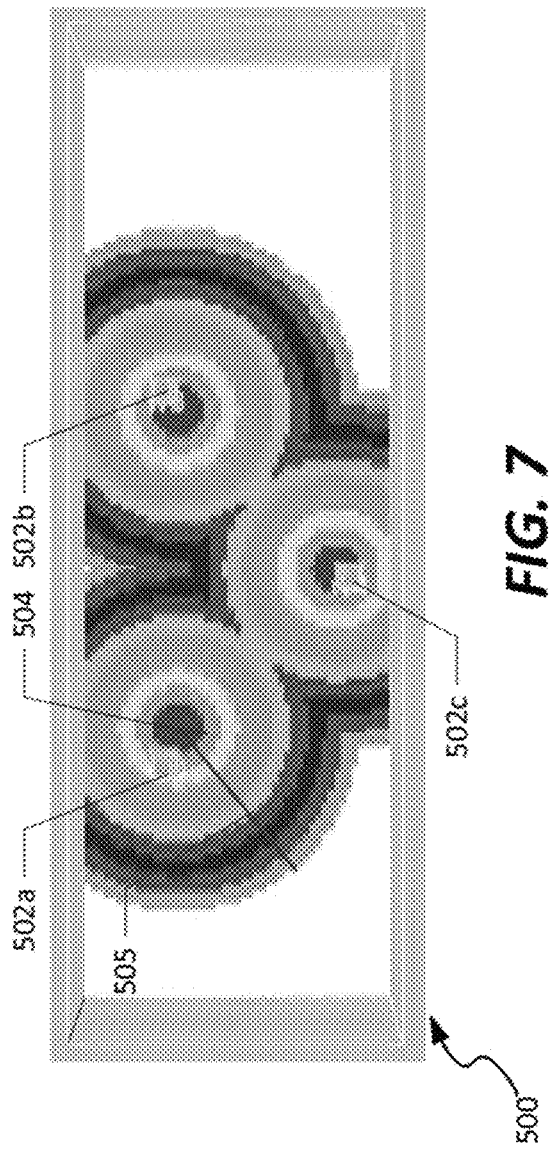
FIG. 7 illustrates a first adjustable SPC process depicting ranges of freedom in a vicinity of a well or other known data useable to modify event-based or object-based models, according to example embodiments discussed herein.

Accordingly, FIG. 7 illustrates three different smoothing windows 504 used in proximity to wells 502, shown as wells 502a-c. As seen in the example shown, surrounding each well 502 are a set of constraints based on a plurality of parameters. In example embodiments, the parameters can include a range of freedom at locations adjacent the well 506, a total range 508, or distance from the well at which smoothing will occur (e.g., the area where the effect of the well data may start to affect an underlying object-based or event-based model), and a maximum smoothing window size (e.g., an amount of smoothing). As illustrated in FIG. 7, a gradation of level of constraint can be enforced, with areas nearer the well 502 being more constrained to the well data and less constrained to an underlying event-based or object-based model, while areas further from the well but within the smoothing window being more constrained to the underlying model, and less constrained to the well data. It is noted that although a circular perimeter around each well 502 is illustrated, other types of well data perimeters or graduated effects of well data could be applied.

Figure 8:
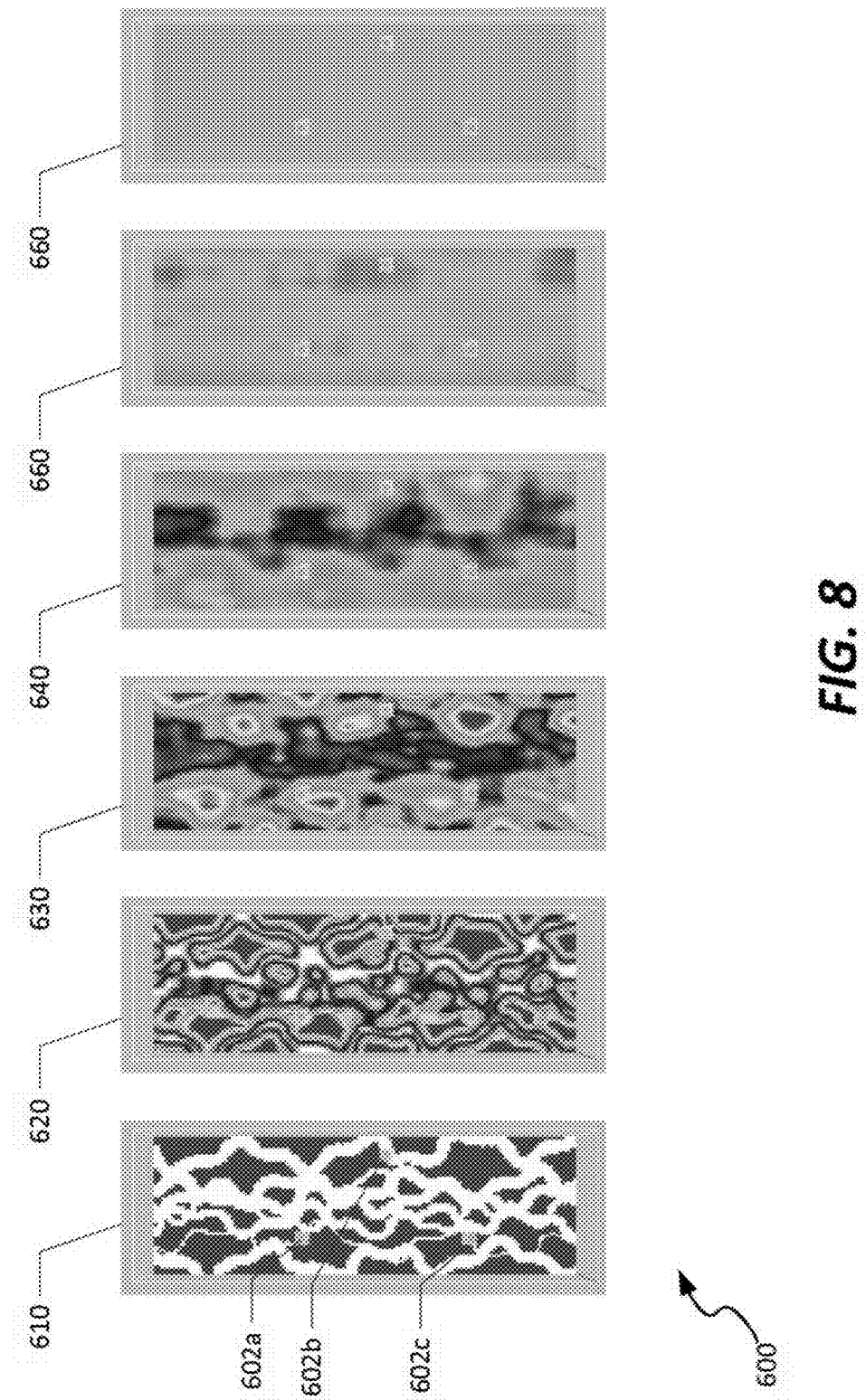
FIG. 8 illustrates a Statistical Process Control (SPC) application of a smoothing window to a selected layer within an example model illustrated in FIG. 6, according to an example embodiment.

FIG. 8 illustrates an end-effect of applying the MPS process described above in connection with FIGS. 1-4 to confirm existing event-based or object-based models to known data in locations where such known data is available.

As seen in FIG. 8, example smoothing windows, defined in terms of numbers of neighboring columns, are shown, with window sizes of 0 (window 610), 2 (window 620), 5 (window 630), 10 (window 640), 20 (window 650), and 40 (window 660) are shown. As seen in those windows, gradually, the underlying modeled information away from well locations (shown as well locations 602*a-c* in window 610, and in corresponding locations across windows 620-660) gradually are diffused. In particular, with a window of 0 neighboring columns, the model is not informed by the known data at well locations 502*a-c*, while with a window of 40, little of the underlying model data (representing the possible channels) remains, with all data conforming instead to the known data values.

As seen in FIGS. 9-10, an example adjustable MPS operation is depicted that can be used for the MPS simulation discussed above in connection with FIGS. 1-2. The smoothing gradient of FIG. 7 is illustrated further in the examples shown in FIGS. 9-10. FIG. 9 illustrates application smoothing windows of FIG. 6 to model data (e.g., the model data seen in FIG. 7 (e.g., from window 510). In this example embodiment, rather than applying the MPS simulation across the entire model volume, such simulation is applied in a gradient within the smoothing windows. FIG. 9 illustrates an example adjusted model window 700 using a 4-cell window adjacent to the well, a 32 cell total smoothing window size, and a maximum smoothing window of 10 cells. By way of contrast, FIG. 10 illustrates an example adjusted model window 800 utilizing a 4-cell window adjacent to the well, a 32 cell total smoothing window size, and a maximum smoothing window of 20 cells. By way of comparison to FIG. 9, a greater extent of smoothing is illustrated in FIG. 10, in that less constraint to the underlying model data is represented within the smoothing windows surrounding wells 602. In both cases, away from the wells 602, the resulting model is constrained to the original model data, and remains unchanged.

Accordingly, referring to FIGS. 1-10 overall, the object- or event-based model generated according to the present disclosure can be coded as a locally variable constraint model, using MPS-based simulation using a selected set of simulation parameters. This allows the model to be varied locally between exact constraints to the event- or object-based model (final model corresponds to the prior model) to completely naïve, based on local trends, local data, or global proportions without any information from the event- or object-based model (e.g., along the gradient shown in FIG. 7, above).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method comprising:
   (a) performing a method of conditioning reservoir model data comprising:
      (i) performing a modeling process within a stratigraphic grid corresponding to a subsurface volume to generate an initial model including one or more facies objects within the model grid, the modeling process including parametric distributions, initial and boundary conditions as well as depositional and erosional rules to define interactions among facies objects within the grid, wherein the modeling process comprises an object- or event-based modeling process, and wherein the initial model comprises an object- or event-based model;
      (ii) measuring the mismatch between the initial model and conditioning well data and potential input trend models used during the modeling process, and deriving a locally variable constraint model from the mismatch; and
      (iii) using the locally variable constraint model to execute a multiple point statistics simulation that varies between completely constrained by the initial model at locations where the initial model is consistent with the conditioning well data and the potential input trend models, and completely unconstrained by the initial model at locations where the initial model does not match the conditioning well data or the potential input trend models, thereby allowing conformance to the conditioning well data and the potential input trend models, wherein a level of the locally variable constraint model varies as a function of the mismatch between the event-based model and the conditioning well data and the potential input trend models.

2. The method of claim 1, wherein the multiple point statistics simulation is constrained to non-stationarity information from the locally variable constraint model, thereby maintaining consistency with the conditioning well data and potential input trend models.

3. The method of claim 2, wherein the non-stationarity information ensures consistency with a prior object- or event-based model.

4. The method of claim 1, wherein the model grid includes a plurality of columns and a plurality of layers, the model defining a plurality of properties at each layer in each column.

5. The method of claim 1, wherein multiple point statistics simulation uses one or more search parameters and a simulation node order to maximize local consistency between the multiple point statistics simulation and the locally variable constraint model.

6. The method of claim 4, wherein the modeling process includes a level of local imprecision at each location within the model grid based on the specific data sources for the conditioning well data and potential input trend models, wherein each location is defined by a column from among the plurality of columns and a layer from among the plurality of layers.

7. The method of claim 1, wherein locations near the conditioning well data are defined at least in part using a window defining an area around the conditioning well data that must conform, at least in part, to the conditioning well data, over which locations the locally variable constraint model is nonspecific and allows the multiple point statistics simulation to freely honor the conditioning well data and potential input trends and potentially diverge from the initial model.

8. The method of claim 1, further comprising assigning a smoothing window locally to control a level of precision in the locally variable constraint model.

9. The method of claim 8, wherein the smoothing window defines a first window within which the locally variable constraint model closely conforms to the initial model and a second window larger than the first window within which the locally variable constraint model has less conformance to the initial model than within the first window.

10. The method of claim 7, wherein an extent of conformance to the conditioning well data decreases as distance from the conditioning well data increases.

11. A system comprising:
a computing system including a programmable circuit and a memory, the memory storing a reservoir modeling application, the programmable circuit configured to execute program instructions included in the reservoir modeling application which, when executed, cause the computing system to:
perform a method for conditioning reservoir model data comprising:
performing a modeling process within a stratigraphic grid corresponding to a subsurface volume to generate an initial model including one or more facies objects within the model grid, the modeling process including parametric distributions, initial and boundary conditions as well as depositional and erosional rules events to define interactions among facies objects within the grid, wherein the modeling process comprises an object- or event-based modeling process, and wherein the initial model comprises an object- or event-based model;
measuring the mismatch between the initial model and conditioning well data and potential input trend models used during the modeling process, and deriving a locally variable constraint model from the mismatch; and
using the locally variable constraint model to execute a multiple point statistics simulation, the locally variable constraint model varying between completely constrained by the initial model at locations where the initial model is consistent with the conditioning well data and the potential input trend models, and completely unconstrained by the initial model at locations where the initial model does not match the conditioning well data or the potential input trend models, thereby allowing conformance to the conditioning well data and the potential input trend models,
wherein the initial model defines facies in a subsurface reservoir.

12. The system of claim 11, wherein locations near the conditioning well data are defined at least in part using a window defining an area around the conditioning well data that must conform, at least in part, to the conditioning well data.

13. The system of claim 12, wherein the window has a size set by a user input into the reservoir modeling application.

14. The system of claim 11, further comprising assigning a smoothing window locally to control a level of precision in the locally variable constraint model.

15. The system of claim 14, wherein the smoothing window defines a first window within which the locally variable constraint model closely conforms to the initial model and a second window larger than the first window within which the locally variable constraint model has less conformance to the initial model than within the first window.

16. A system comprising:
a computing system including a programmable circuit and a memory, the memory storing a reservoir modeling application and a reservoir model, the programmable circuit configured to execute program instructions included in the reservoir modeling application which, when executed, cause the computing system to:
perform a method for conditioning reservoir model data comprising:
defining the reservoir model as a representation of a subsurface volume, the reservoir model including a model grid including a plurality of columns and a plurality of layers, the reservoir model defining a plurality of properties at each layer in each column;
performing an object- or event-based modeling process within the model grid to generate an initial model defining one or more facies objects stored within the model grid, the object- or event-based modeling process including parametric distributions, initial and boundary conditions as well as depositional and erosional rules to define the facies objects within the model grid;
computing a locally variable constraint model that defines, for one or more locations within the initial model, one or more constraints to be applied to a multiple point statistics simulation to locally constrain the level of conformance to either the initial model or conditioning well data and a potential input trend model; and
executing the multiple point statistics simulation constrained to the locally variable constraint model,
wherein, the level of locally variable constraint specificity varies as a function of the local mismatch between the initial model and the conditioning well data and the potential input trend model.

* * * * *